United States Patent [19]
Mukai et al.

[11] Patent Number: 6,052,156
[45] Date of Patent: Apr. 18, 2000

[54] DIGITAL COLOR ENCODER HAVING SAMPLING FREQUENCY CONVERTER

[75] Inventors: Takuo Mukai, Ikeda; Kentarou Hara, Takatsuki; Masaharu Adachi, Ikeda, all of Japan

[73] Assignee: Ricoh Company, Ltd., Tokyo, Japan

[21] Appl. No.: 08/807,239

[22] Filed: Feb. 28, 1997

[30] Foreign Application Priority Data

Feb. 29, 1996 [JP] Japan .................................. 8-043212

[51] Int. Cl.$^7$ ................................................ H04N 9/65
[52] U.S. Cl. .................... 348/642; 348/624; 345/154; 341/144
[58] Field of Search ................ 358/13, 11, 140; 348/723, 724, 708, 711, 713, 720, 642, 624, 572; 345/154; 341/152, 144; H04N 7/01, 5/40, 9/65, 11/04, 11/06, 11/14, 11/16, 11/12

[56] References Cited

U.S. PATENT DOCUMENTS 4,542,369  9/1985  Kasuga ...................................... 341/144
4,982,179  1/1991  Ogawa et al. ............................ 348/642

OTHER PUBLICATIONS

Haskell, B.G. "Sampling Rate Conversion for NTSC Color Television", IEEE Transactions on Communications vol. Com–25, No. 7, pp. 707–712, Jul., 1977.

*Primary Examiner*—David E. Harvey
*Attorney, Agent, or Firm*—Cooper & Dunham LLP

[57] ABSTRACT

A digital color encoder capable of reducing the aperture distortion of D/A conversion and the waveform distortion of the video signal without resulting in the increase of the consumed electric current. At first, digital signals sampled with a sampling frequency are inputted as original color signals. The digital composite color video signals of the sampling frequency fl are created from those signals by digital signal processing with the combination of matrix circuit, color burst controlling circuit, modulation circuit, addition circuit, and synchronization signal adding circuit, etc. Next, the sampling frequency of the composite color video signal is converted by a sampling frequency converting circuit inserted immediately before the D/A converter. The converted signal is further converted to an analog signal capable of being inputted into the TV set by a D/A converter, and the signal is outputted as a video signal.

17 Claims, 7 Drawing Sheets

DIGITAL COLOR ENCODER HAVING SAMPLING FREQUENCY CONVERTER

BACKGROUND OF THE INVENTION

1. Field of the Invention

The present invention relates to a digital color encoder used in an apparatus such as a game player or a video CD player, for example, equipped with a video output terminal for outputting a composite color video signal capable of being inputted into a television image receiving set.

2. Description of the Related Art

In the case of generating a composite color video signal capable of being inputted into a television image receiving set (TV image receiving set) from three color component video signals (e.g., digital color signals R, G and B) corresponding to three original colors of light (hereinafter, called "original color signal"), an analog system color encoder has conventionally been used. However, in recent years, digital color encoders have been used to generate the above-mentioned composite color video signals by performing digital signal processing on the signals.

Figure 9:
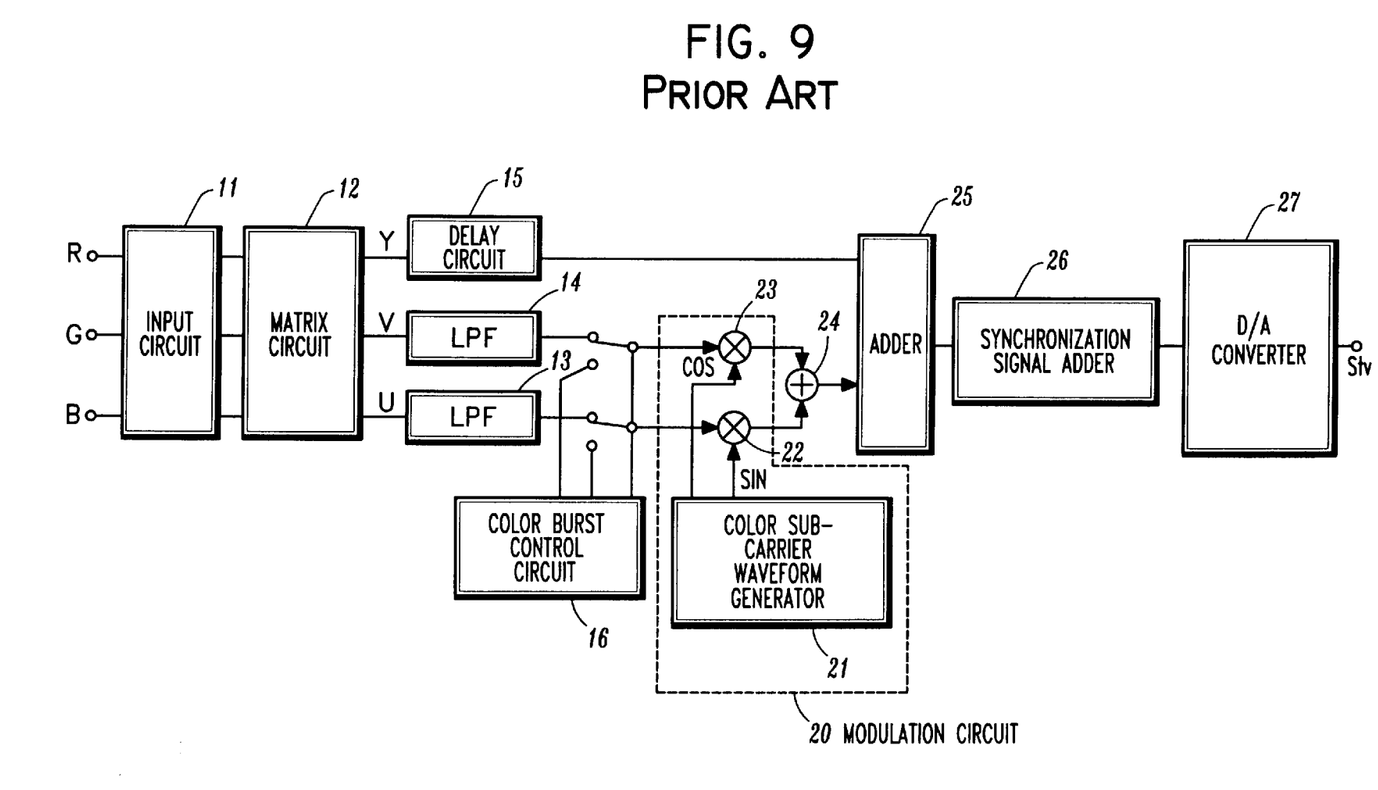
FIG. 9 is a block diagram showing an overall construction of a conventional digital color encoder.

FIG. 9 is a block diagram showing a basic structure of such a digital color encoder as mentioned above. Referring to FIG. 9, the conventional digital color encoder is described hereinafter.

The digital color encoder is formed by connecting an input circuit 11, a matrix circuit 12, low-pass filters (LPFs) 13 and 14, a delay circuit 15, a color burst controlling circuit 16, a modulation circuit 20, an adder 24, an addition circuit 25, a synchronization signal adding circuit 26, and a D/A converter 27, as shown in FIG. 9. In such structure, a composite color video signal Stv capable of being inputted into a TV image receiving set is generated from the original digital color signals R, G, and B using a method as described below.

At first, signals are sampled with a predetermined sampling frequency to provide the original color signals R, G, and B which are inputted from the external side by use of the input circuit 11, where the inputted signals are respectively latched. The original color signals R, G, and B thus latched are transmitted to the matrix circuit 12 where they are composed in a known manner so that a brightness (luminance) signal Y and two color difference signals U and V are generated and output.

The color difference signals U and V are limited to a predetermined band width by the low-pass (digital) filters (LPFs) 13 and 14, and a color subcarrier signal of predetermined phase and amplitude is inserted by a predetermined cycle number during a certain period instead of the color difference signals U and V by use of the color burst controlling circuit 16. (Here, the inserted signal is called "a color burst signal"). Thereafter, the color difference signals U and V are inputted into the modulation circuit 20. The modulation circuit 20 comprises a color subcarrier signal generator 21 and multipliers 22 and 23. Two color subcarrier signals having a phase difference of 90° are generated by the color subcarrier signal generator 21 and are respectively balance-modulated with the color difference signals U and V by use of the multipliers 22 and 23.

The two signals thus balance-modulated are added to each other by the adder 24 and inputted into the addition circuit 25 as chrominance signal. In the addition circuit 25, the chrominance signal and the brightness (luminance) signal Y, time-adjusted by the delay circuit 15, are composed. The signal output by addition circuit 25 has a synchronization signal added thereto by the synchronization signal adding circuit 26 to produce a digital composite color video signal.

All of the above-mentioned processings are executed by digital signal processing, and therefore the composite color video signal is a digital signal at this point during the processing. Consequently, the composite color video signal is converted to an analog signal by the D/A converter 27, and the converted signal is outputted as an analog composite color video signal (hereinafter, called "video signal") capable of being inputted into the TV image receiving set.

In the conventional digital color encoder as described above, the sampling frequency of the signal to be inputted to the final-stage D/A converter is the same as that of the original color signals R, G, and B. For example, a frequency of 13.5 MHz is used in accordance with the CCIR (International Radio Consultive Committee) Recommendation as the sampling frequency. However, in this type of system, the following problems may occur:

(1) The high-frequency area component of the video signal is attenuated due to aperture distortion caused by the D/A conversion.

(2) Since the number of sampling points per time period of the transmission color signal is about 3–4, wave form distortion arises in the video signal. In principle, the signal output by D/A converter 27 is transmitted through an analog low-pass filter (LPF) which has a property of removing the upper sideband components contained in the digital composite video signal. That is, the analog LPF has a property of attenuating the high-frequency component not smaller than ½ of the sampling frequency so that it is possible to obtain a video signal without any distortion.

However, in practice, phase distortion may occur and the above-described analog LPF cannot be used. Accordingly, wave form distortion occurs in the video signal when the the aforementioned sampling frequency is used. Consequently, there arises a further problem to be solved at the side of the TV image receiving set to which the video signal is inputted. For instance, in a case in which the color burst signal contained in the video signal is distorted, when the standard subcarrier signal necessary for demodulating the chrominance color signal is created from the color burst signal in accordance with a PLL (Phase Locked Loop) method, the created signal is not locked or the locked state cannot be kept on some occasions. Furthermore, some obstacles appear on the image displaying surface of the TV image receiving set due to the wave form distortion of the video signal on some occasions.

On the other hand, it is possible to consider a countermeasure for eliminating the above-described problems, by selecting a higher sampling frequency to start with. However, if the sampling frequency is set to a high value, the amount of consumed electric current increases and circuit design becomes difficult.

SUMMARY OF THE INVENTION

The present invention has been made in consideration of the above-mentioned actual circumstances and troublesome matters to be solved.

It is an object of the present invention to solve the points at issue as mentioned heretofore.

It is another object of the present invention to suppress the occurrence of an aperture distortion due to the D/A conversion without increasing the consumed electric current and without making the circuit design difficult.

It is still another object of the present invention to provide a digital color encoder capable of reducing the wave form distortion caused in the video signal by suppressing the occurrence of the aperture distortion due to the D/A conversion.

It is still another object of the present invention to provide a digital color encoder capable of reducing the waveform distortion caused in the video signal by decreasing the number of the sampling points per period.

According to a first embodiment of the present invention, a digital color encoder executes a series of digital signal processings including a matrix operational calculation, a frequency band width limitation, a right angle two-phase balancing modulation, and a processing corresponding to an addition of a color burst signal and a synchronization signal, all respectively performed for original color signals obtained by digital video signals corresponding to three original colors of light, and thereby generating a digital composite color video signal sampled with a first sampling frequency, and further generating an analog composite color video signal which can be created by converting the digital composite color video signal by use of a D/A converter and inputted into a television image receiving set. The digital color encoder comprises a sampling frequency converter for converting the sampling frequency of the digital composite color signal to a second sampling frequency higher than the first sampling frequency and thereafter inputting the converted digital composite color video signal into the D/A converter.

According to another embodiment of the present invention, the sampling frequency converter includes a high-order digital filter for performing interpolative processing on the basis of the value of the digital composite color video signal, and the sampling frequency of the digital composite color video signal is converted from the first sampling frequency to the second sampling frequency higher than the first sampling frequency by use of the high-order digital filter. The high-order digital filter can comprise a third-order digital filter, for example.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
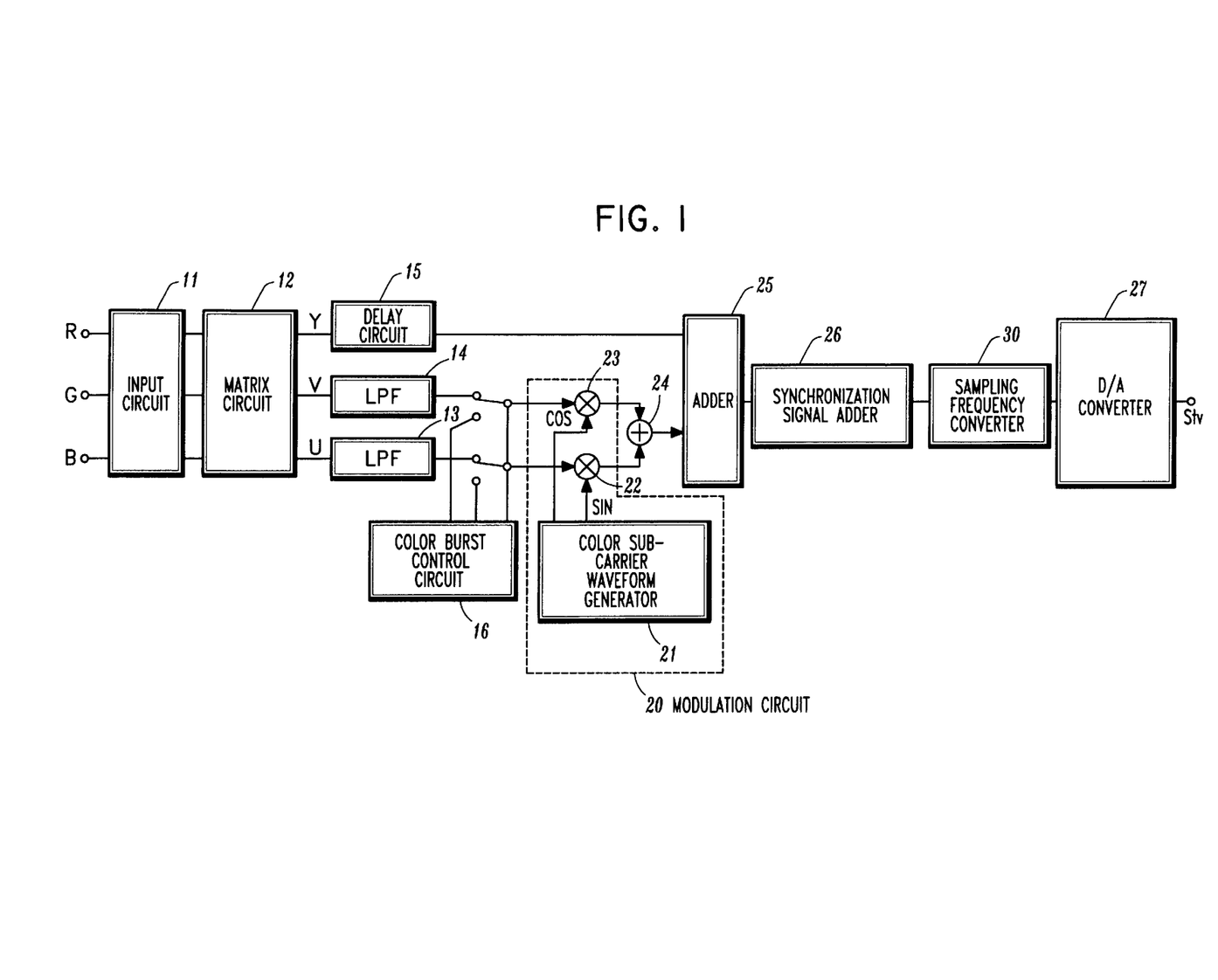
FIG. 1 is a block diagram showing an overall construction of a digital color encoder according to an embodiment of the present invention.

FIG. 1 is a block diagram showing an overall construction of a digital color encoder according to an embodiment of the present invention.

The digital color encoder includes an input circuit 11, a matrix circuit 12, low-pass filters (LPFs) 13 and 14, a delay circuit 15, a color burst controlling circuit 16, a modulation circuit 20, an adder 24, an addition circuit 25, a synchronization signal adding circuit 26, and a D/A converter 27. The digital color encoder shown in FIG. 1 is similar to that shown in FIG. 9, with a very important difference. As shown in FIG. 1, the digital color encoder according to the present invention includes a sampling frequency converting circuit 30 which is provided just before the D/A converter 27.

In the present embodiment, the sampling frequency converting circuit 30 has a function of doubling the sampling frequency of the composite color video signal outputted from the addition circuit 25, as will be described below.

In the digital color encoder according to the first embodiment, as in the case of the conventional encoder shown in FIG. 9, at first, the digital color component signals, R, G, and B, which are sampled with a predetermined sampling frequency (hereinafter, called "first sampling frequency f1") are inputted by use of the input circuit 11, and the inputted signals are latched. For example, a sampling frequency of the original color component signals, R, G, and B is 13.5 MHz as prescribed in accordance with the CCIR Recommendation.

The original color signals R, G, and B latched in the input circuit 11 are transmitted to the matrix circuit 12. In the matrix circuit 12, the original color component signals R, G, and B are processed in a known manner in accordance with, for example, a ratio of the sensitivity of the human naked eye to the brightness of each color. As a result, a brightness (luminance) signal Y and two color difference signals U and V are created. The band width of the color difference signals U and V is limited for the purpose of facilitating the transmission thereof, by use of LPFs 13 and 14. That is, the color difference signals U and V are respectively inputted to the LPFs 14 and 14 employed as digital filters. By passing the signals through LPFs 13 and 14, the color difference signals U and V are limited to a predetermined band width. This utilizes the property of the human naked eye which cannot judge the color on an area of a square measure not larger than a predetermined value.

Thereafter, the color burst signal is inserted into the color difference signals U and V by the color burst controlling circuit 16. Namely, a predetermined cycle number of the color subcarrier signals used for the modulation in the modulation circuit 20 is inserted with predetermined phase and amplitude. Thereafter, the color difference signals U and V are transmitted to the modulation circuit 20. The modulation circuit 20 comprises a color subcarrier signal generator 21 for generating a first subcarrier signal SIN and a second subcarrier signal COS as two color subcarrier signals having a phase difference of 90°, a multiplier 22 for multiplying the color difference signal U and the first subcarrier signal SIN, and a multiplier 23 for multiplying the color difference signal V and the second subcarrier signal COS. In such construction, the first subcarrier signal SIN and the second subcarrier signal COS are respectively balance-modulated with the color difference signals U and V. The two signals obtained by the balance-modulation are processed in the adder 24, and thereby the color subcarrier signals can be created. The color subcarrier signals are inputted into the addition circuit 25, and the inputted signals are processed with the brightness signal Y, which is time-adjusted with the delay circuit 15, by the addition circuit 25. A synchronization signal is added to the above composed signal by the synchronization signal adding circuit 26, to obtain a composite digital color video signal.

The processings mentioned heretofore are performed on the digital signals obtained by sampling the respective signals with a signal having a first sampling frequency f1. Consequently, the composite color video signal outputted from the synchronization signal adding circuit 26 is also a digital signal sampled with the first sampling frequency f1 and the signal is inputted into the sampling frequency converting circuit 30. In the sampling frequency converting circuit 30, the sampling frequency of the composite color video signal is converted from the first sampling frequency f1 to a second sampling frequency f2 which is two times the frequency of f1 (f2=2f1). The composite color video signal thus obtained by the second sampling frequency f2 is converted to an analog signal by the D/A converter 27 and outputted as a video signal Stv.

Figure 2:
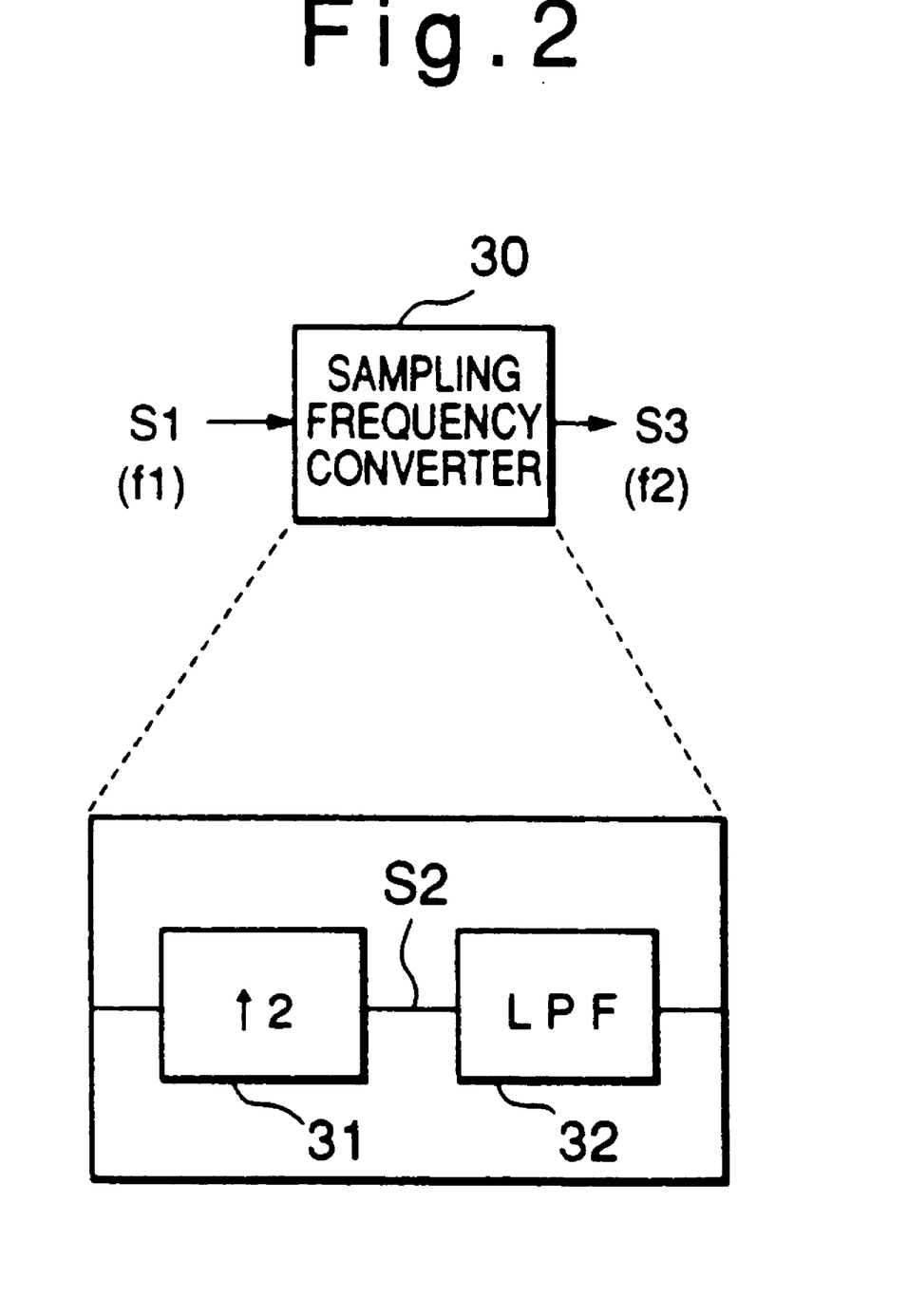
FIG. 2 is a block diagram showing diagrammatically the construction of a sampling frequency converting circuit in the digital color encoder according to an embodiment of the present invention.

FIG. 2 is a block diagram diagrammatically showing the construction of the sampling frequency converting circuit 30 in the digital color encoder of the present invention. As shown in FIG. 2, the sampling frequency converting circuit 30 can be expressed as a construction obtained by connecting a two-times-up sampler 31 and an LPF 32 in cascade.

Figure 3A:
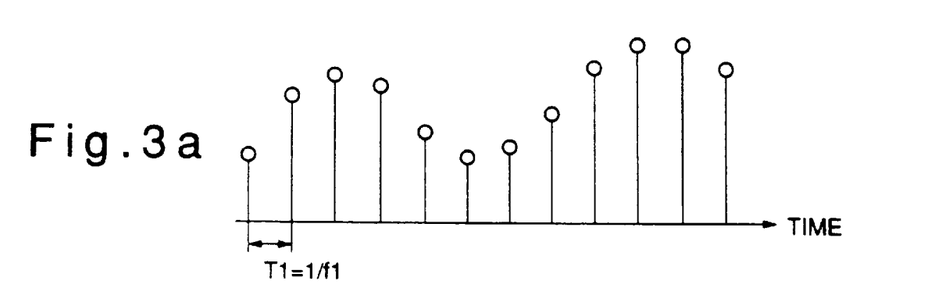
FIGS. 3a through 3c are explanatory diagrams showing sampling value rows for explaining the operation of the sampling frequency converting circuit.
Figure 3B:
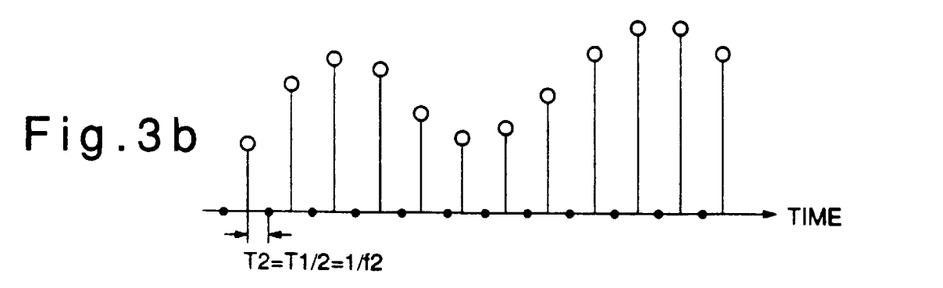
Figure 3C:
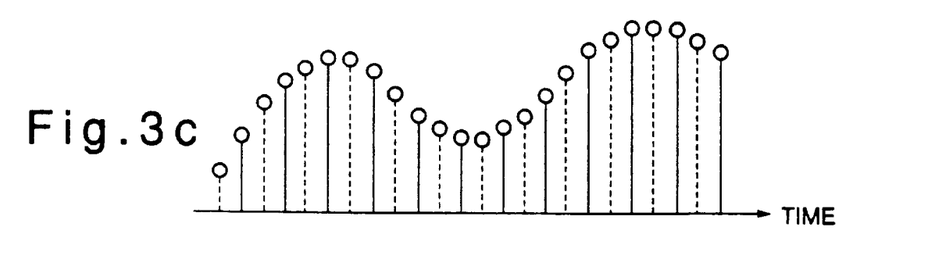

The two-times-up sampler 31 adds a sampling point of zero value at a middle point between the respective adjacent two sampling points of the digital signal S1 sampled with the frequency f1 shown in FIG. 3a, as illustrated in FIG. 3b. In such manner, the signal value row having a time interval of the period $T_1=1/f1$ is converted to a signal value row having a time interval of half that period, that is, $T_2=T_1/2$. In other words, the digital signal S2 has a sampling frequency f2=2f1. The digital signal S2 is inputted into the LPF 32 where interpolative processing is executed. Thereby, the value of the sampling point added by the two-times-up sampler 31 (i.e., the zero value) is replaced with a value obtained by the interpolative processing employing the respective values (sampling values) of the digital signal S1 of the sampling frequency f1. In such a manner, a digital signal S3 as shown in FIG. 3c can be obtained by the action of the interpolative processing performed by the LPF 32, and the signal S3 thus obtained is outputted from the sampling frequency converting circuit 30 as a digital signal having a sampling frequency f2.

Figure 4A:
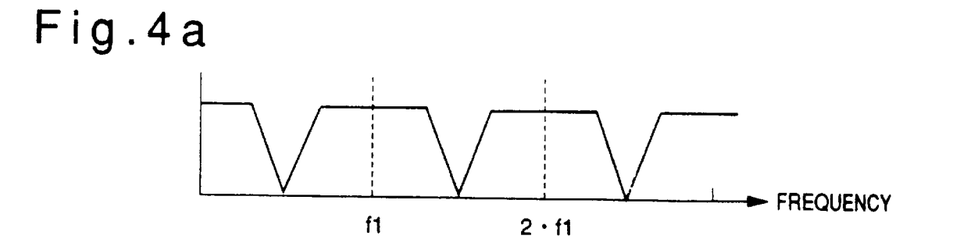
FIGS. 4a through 4d are explanatory diagrams showing frequency spectra for explaining the operation of the sampling frequency converting circuit.
Figure 4B:
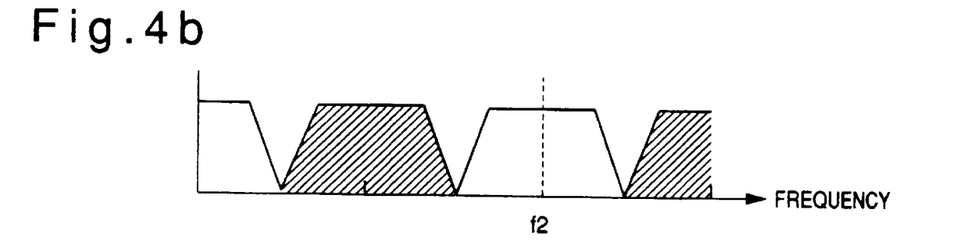
Figure 4C:
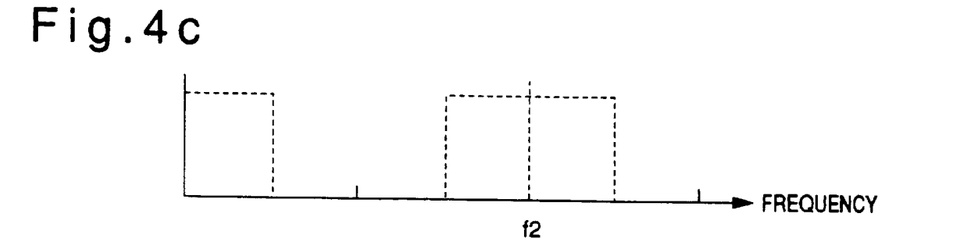
Figure 4D:
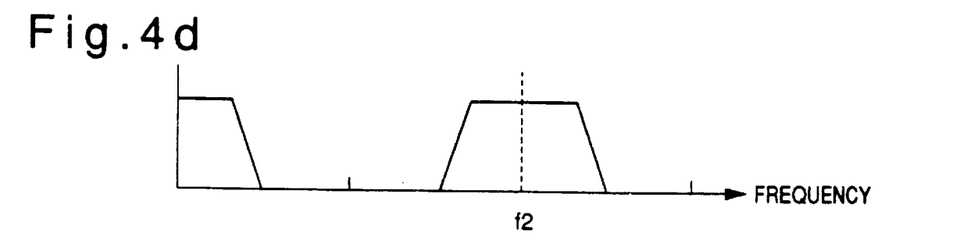

FIGS. 4a through 4d are explanatory diagrams showing frequency spectra of the above-mentioned respective digital signals S1–S3 for explaining the operation of the sampling frequency converting circuit 30. As shown in FIG. 4a, the digital signal S1 (input signal to be inputted to the two times-up sampler 31) inputted to the sampling frequency converting circuit 30 has a spectrum repeating the pure spectrum component corresponding to the spectrum component of the original (color) signal (spectrum component in the range of 0~f1/2) and the other spectrum component turned back at the point of f1/2 (spectrum component in the range of f1/2~f1) at a constant time interval of the sampling frequency f1. As shown in FIG. 4b, the digital signal S2 passing through the two-times-up sampler 31 has a spectrum repeated at another constant time interval of the sampling frequency f2. The spectrum is substantially the same as the spectrum of the digital signal S1 shown in FIG. 4a, and it is a spectrum repeated at the time interval of the sampling frequency f1. The LPF 32 performing the interpolative processing is a digital filter for attenuating a portion of the signal shown with the oblique lines in the spectrum of FIG. 4b (hereinafter called "mirror image component"), and it has a frequency property as shown in FIG. 4c. Consequently, the digital signal S3 passing through the LPF 32 has a frequency spectrum as shown in FIG. 4d, and it is outputted from the sampling frequency converting circuit 30.

Figure 5A:
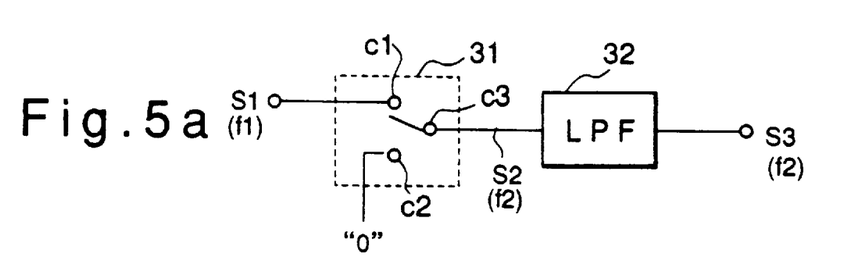
FIGS. 5a and 5b are block diagrams showing an embodiment of the sampling frequency converting circuit.
Figure 5B:
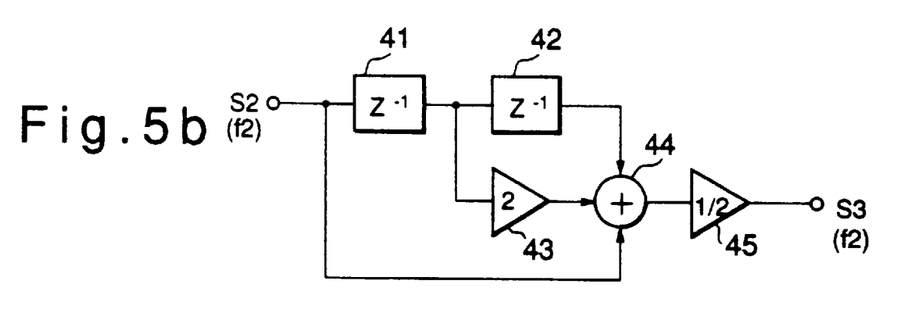

FIGS. 5a and 5b are block diagrams showing examples of the above-mentioned sampling frequency converting circuit 30. In the example, as shown in FIG. 5a, the two-times-up sampler 31 shown in FIG. 2 is realized (practically used) as a change-over switch which switches at a frequency f2 for alternately connecting a contact c3 to another contact c1 to which the digital signal S1 of the sampling frequency f1 is applied and to another contact c2 to which a fixed signal having a value of "0 (zero)" is applied.

In the LPF 32 for performing the interpolative processing, the transmission function can be expressed by the following equations (1):

$$H(Z) = \sum (n = 0, N-1) h(n) \cdot Z^{-n} \qquad (1)$$
$$= h(0) + h(1) \cdot z^{-1} + h(2) \cdot z^{-2} + h(N-1) \cdot z^{-(N-1)}.$$

Here, "$z^{-1}$" is a unit delay calculating element, and "$\Sigma$" is a symbol of total sum. For instance, "$\Sigma(1=n1, n2)$" signifies a procedure of taking the total sum from i=n1 to i=n2 for the subsequent terms.

The LPF 32 of the present embodiment has the simplest construction among the LPFs expressed by the above equations (1) for performing the interpolative processing. The transmission function thereof can be expressed by the following equation (2):

$$H(Z)=(1+2 \cdot Z^{-1}+1 \cdot Z^{-2})/2 \qquad (2)$$

The LPF 32 having the transmission function expressed by the above equation (2) can be realized, for example, by connecting unit delay elements 41 and 42 corresponding to the sampling frequency f2, a multiplier 43 for multiplying the output of element 42 by a coefficient 2, an adder 44, and another multiplier 45 for multiplying by another coefficient ½, as shown in FIG. 5b.

In such construction, the value of the sampling point added by the two-times-up sampler 31 becomes the value obtained by linear interpolative processing. That is, assuming that the values of the sampling points adjacent to each other at the input signal S1 of the sampling frequency f1 are, respectively, Xa and Xb, the value Xi of the sampling point added therebetween becomes:

$$Xi=(Xa+Xb)/2 \qquad (3)$$

Figure 6:
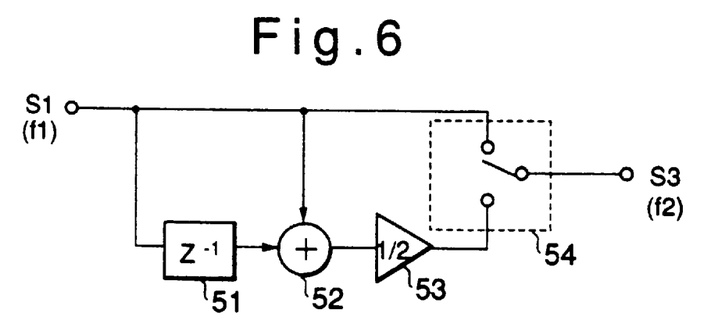
FIG. 6 is a block diagram showing another embodiment of the sampling sampling frequency converting circuit.

In the sampling frequency converting circuit 30 of the above-mentioned construction as shown in FIGS. 5a and 5b, the sampling value of "0 (zero)" is inserted between the (adjacent) signals of the sampling frequency f1 in order to obtain a sampling frequency f2, and thereafter interpolative processing is performed. However, since the calculation for the sampling value of the value "0 (zero)" can be omitted, it is also possible to realize the sampling frequency converting circuit 30 by adopting the construction as shown in FIG. 6 for switching signals at a switching frequency f2. That is, it is possible to realize the sampling frequency converting circuit by employing the construction in which a unit delay element 51 corresponding to the sampling frequency f1 before conversion, an adder 52, a multiplier 53 for multiplying by a coefficient ½, and a change-over switch 54 for switching signals at a frequency f2 are connected to each other as shown in FIG. 6. Then, the signal obtained by multiplying the additional signal obtained by adding the input signal to the time-delayed signal thereof by the coefficient ½ can be created, and the signal thus multiplied and the input signal are alternately changed over at a frequency f2. Thereby, the signal S3 which is the same as the output signal obtained by the constructions as shown in FIGS. 5a and 5b can be created.

Moreover, in the constructions as shown in FIGS. 5a and 5b and FIG. 6, the sampling frequency f2 after the conversion becomes two times the sampling frequency f1 before the conversion, namely, both frequencies satisfy f2=2·f1. As to the sampling frequency converting circuit for converting the present frequency to the other frequency of integral number times excluding two times, namely, for satisfying f2=m·f1 (m is an integral number), it is also possible to realize the sampling frequency converting circuit in a similar way, by adopting the construction in which an m-times-up sampler and the LPF for performing the interpolative processing are connected to each other in cascade.

According to the first embodiment as mentioned heretofore, since the sampling frequency of the complex color video signal is converted from the sampling frequency f1 to another sampling frequency f2=2·f1 (or f2=m·f1) by use of the sampling frequency converting circuit 30 inserted immediately before the D/A converter 27, namely, the sampling frequency is raised, the occurrence of the aperture distortion in the D/A converter 27 can be suppressed and the attenuation of the high-frequency component in the complex color video signal converted to the analog signal can be improved. And further, since the high frequency mirror image component (oblique-lines portion in FIG. 4b) can be attenuated by the conversion of the sampling frequency (refer to FIG. 4d), the waveform distortion of the chrominance signal and the color burst signal can be improved.

Furthermore, as shown in FIG. 4d, the distance between the upper limit of the pure component which is the basic band width of the frequency spectrum and the lower limit of the side band component is widened by the conversion of the sampling frequency. For this reason, the cut-off properties required of an analog low-pass filter (analog LPF) for causing the signal after D/A conversion can be eased, and thereby the designing of the analog LPF can be facilitated.

If the sampling frequency converting circuit 30 is inserted into a position other than immediately before the D/A converter 27, the following problems may occur. For instance, if the sampling frequency converting circuit 30 is inserted immediately before the modulation circuit 20, all of the circuits for respectively performing the subsequent processings must operate at the higher frequency f2=m·f1 (m is an integral number). Accordingly, the consumed electric power inevitably rises. And further, the modulation circuit 20 would have to operate at the frequency f2. Therefore, for instance, in the case of creating the color subcarrier signal generator 21 by use of ROM, the capacitance of the ROM may increase. Furthermore, since the stage number of the pipe-line register to be inserted increases in the processing flow as shown in FIG. 1, the scale of the employed circuit also increases. In general, it is difficult to design a circuit operating with a high frequency compared with a circuit operating with a low frequency. On the other hand, when the sampling frequency converting circuit 30 is inserted immediately before the D/A converter 27 as in the case of the present embodiment, the circuits from inputting the original color component signals R, G, and B to creating the composite color video signal (the input circuit 11 to the addition circuit 25) can be operated at a lower frequency f1. Consequently, it is possible to avoid the problems to be solved, such as the increase of the consumed electric power due to the increase of the sampling frequency, the increase of the circuit scale, and the difficulty of the circuit design.

In the first embodiment as mentioned heretofore, the LPF 32 for performing the interpolative processing in the sampling frequency converting circuit 30 is realized by a second-order LPF which is a digital filter having a transmission function expressed by the equation (1) (refer to FIG. 5b). However, the linear interpolative processing performed by the second-order LPF may not guarantee sufficient interpolative processing precision. Consequently, it is preferable to use a high-order LPF (e.g., not lower than third-order) as the LPF 32 for performing the interpolative processing. For instance, it may be desirable to employ a LPF having a transmission function as expressed by the following equation:

$$H(Z)=(24-48Z^{-2}+161Z^{-4}+256Z^{-5}+161Z^{-6}-48Z^{-8}+24Z^{-10})/256.$$

The LPF of the above transmission function can also be realized by use of a unit delay element, a multiplier, and an adder, as in the case of using the second-order LPF as shown in FIG. 5b. By employing such high-order LPF, it is possible to enhance the functional effect of the present embodiment such as suppression of the aperture distortion occurrence in the D/A conversion and prevention of the waveform distortion in the chrominance signal or the color burst signal both caused by the high-frequency component.

However, in the case of performing the interpolative processing by using the high-order filter, a "ringing" phenomenon may occur as a result of filtering at the sharply-changing portion of a signal before the interpolative processing.

Figure 7:
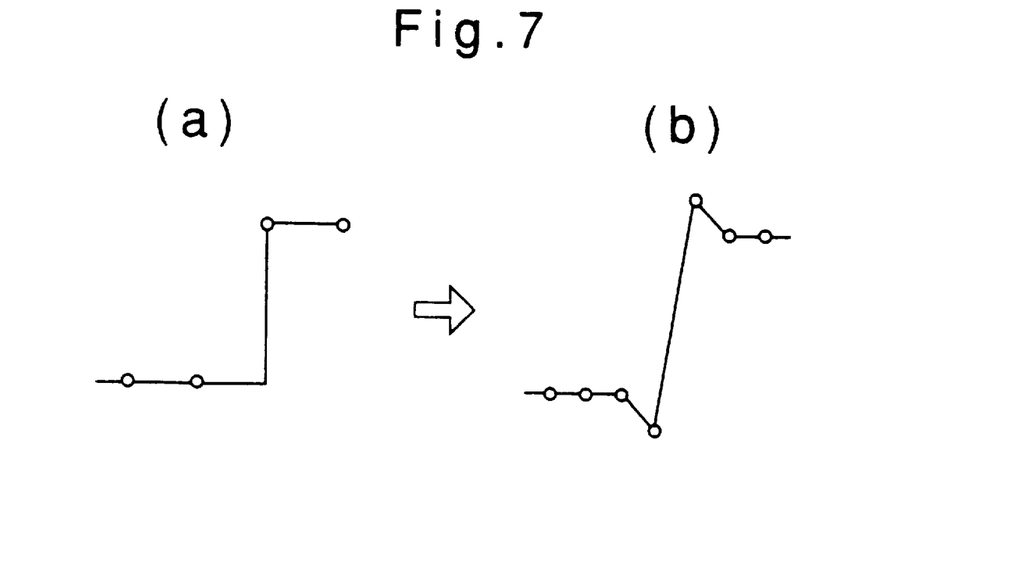
FIG. 7 is a diagram of two wave forms before and after being treated with interpolative processing by use of a high order LPF (low-pass filter) for explaining the occurrence of ringing due to the interpolative processing.

In the case of employing the digital color encoder relating to the present invention, the synchronization signal, etc. may be included in the composite color video signal as a sharply-changing portion. The "ringing" phenomenon may happen at this portion as shown in FIG. 7. When the video signal including such ringing signal is inputted into the TV image receiving set, there arises a fear of a mis-operation of the TV image reception. In such a situation, it is preferable to use a sampling frequency converting circuit 30 as shown in FIG. 8, to employ a high-order LPF as the LPF 32 for performing the interpolative processing.

Figure 8:
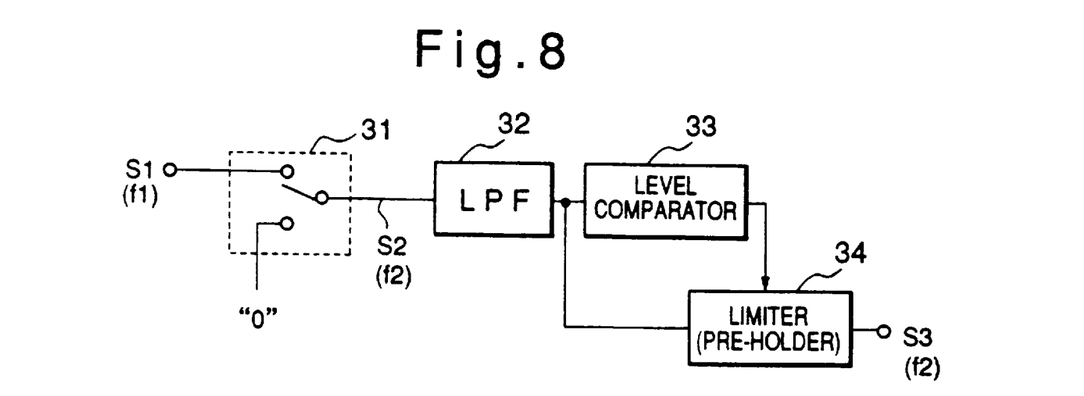
FIG. 8 is a block diagram showing another embodiment of the sampling frequency converting circuit.

The sampling frequency converting circuit 30 having the structure as shown in FIG. 8 comprises a level comparator 33 and a limiter 34 at the subsequent stages of the LPF 32 for performing the interpolative processing. The composite color video signal after the interpolative processing passing through the LPF 32 is inputted to the level comparator 33 and the limiter 34. The level comparator 34 compares the composite color video signal with a predetermined maximum or minimum value. The limiter 34 limits the composite color video signal after the interpolative processing to the maximum value when it is larger than the maximum value, while the limiter 34 limits the same signal to the minimum value when it is smaller than the minimum value. Consequently, the composite color video signal becomes a signal limited within the range from the minimum value to the maximum value, and the signal is outputted from the sampling frequency converting circuit. By suitably setting the maximum value and the minimum value, the ringing portion contained in the composite color video signal after the interpolative processing can be removed.

Instead of using a limiter 34 in such a construction, it may be preferable to employ a structure provided with a pre-putting holder for replacing the value at the sampling point by the value at the point immediately before the sampling point in which the composite color video signal (sampling value row) after the interpolative processing is larger than the maximum value or smaller than the minimum value. In such construction, the ringing portion contained in the composite color video signal after the interpolative processing can also be removed.

The aforementioned embodiments show a FIR type filter (Limited Impulse Response Type) as the digital filter (LPF) 32 for performing the interpolative processing in the sampling frequency converting circuit 30. Refer to the equation (1). It is also possible to realize the LPF 32 for performing the interpolative processing as an IIR type filter (Unlimited Impulse Response Type). However, it is preferable to use the FIR type filter because the linear phase is preferable as the phase property of the LPF 32. However, the construction of the sampling frequency converting circuit 30 according to the present invention is not always limited to the above-mentioned construction.

Moreover, as is well known, the linear-phase FIR type filter can be constructed simply by using a multiplier realized by a combination of shifting and adding and a latch. And further, the transmission function of the IIR type filter can be generally expressed by the following equations:

$$H(Z)=\{\Sigma(m=0, M)a_m Z^{-m}\}/\{1\Sigma(n-1, N)b_n Z^{-n}\}=(a_0+a^1 Z^{-1}+\ldots +a_M Z^{-M})/(1+b_1 z^{-1}+\ldots+b_N Z^{-N}).$$

The above explanations of the embodiments do not relate to the system of color television broadcasting. However, as is apparent from the construction of the above explained embodiments, the present invention can be applied for both occasions of creating the video signals (composite color video signals) of the NTSC system and the PAL system.

According to the first digital color encoder of the present invention, immediately before the digital composite color video signal of the first sampling frequency obtained by the digital signal processing for the original color signals is converted to the analog signal by the D/A conversion means, the sampling frequency is converted from the first frequency to a second sampling frequency higher than the first frequency. Thereby, the occurrence of the aperture distortion in the D/A conversion is suppressed, and the attenuation of the high-frequency component in the analog composite color video signal is improved. And further, since the mirror image component in the spectrum of the digital composite color video signal can be attenuated by the conversion of the sampling frequency, the waveform distortion of the chrominance signal or the color burst signal can be improved. As a result, a stable color burst signal can be applied to the TV image receiving set, and thereby the image on the image screen of the TV image receiver can be improved. And further, since the distance between the upper limit of the pure component and the lower limit of the side wave band width component is widened in the frequency spectrum of the digital composite color video signal after performing the sampling frequency conversion, the cut-off property of the analog low-pass filter after the D/A conversion can be made mild (not sharp), and thereby the designing of the filter can be facilitated.

Furthermore, the sampling frequency converting means is inserted immediately before the D/A converter, and the circuit for creating the digital composite color video signal from the original color signal operates with a low frequency (first sampling frequency) before the conversion. Therefore, it may be possible to suppress the increase of the consumed electric current which would otherwise accompany raising the sampling frequency, the difficulty of the circuit design, and the increase of the circuit scale.

According to the second digital color encoder of the present invention, when the sampling frequency of the digital composite color video signal is converted (raised), since a third-order digital filter (LPF) is employed for the interpolative processing necessary for converting the sampling frequency, it can be done precisely. Thereby, it may be possible to enhance the above-mentioned functional effects such as the suppression of the aperture distortion occurrence in the D/A conversion and the improvement of the attenuation of the high-frequency component in the analog composite color video signal, etc.

According to still other digital color encoders of the present invention, the value of the composite color video signal is corrected on the basis of the detected result of the signal level so that the composite color video signal value after converting the sampling frequency exists in the pre-determined area. For this reason, by suitably setting the above area, the ringing occurrence in the case of employing the high-order LPF in the above-mentioned interpolative processing can be suppressed. Thereby, the misjudgment of detecting the synchronization signal in the TV image receiving set can be prevented.

According to another digital color encoder of the present invention, even in the case of performing the above-mentioned interpolative processing by use of the high-order LPF at the time of converting the sampling frequency, since the value at the newly added sampling point is made equal to the value at the sampling point immediately before the present sampling point in the flyback line erasing period (blanking period) containing the synchronization signal, there occurs no phenomenon of the ringing even in the portion (area) of the synchronization signal in which the signal value changes sharply. Consequently, the misjudgment of the synchronization signal detection in the TV image receiving set can be prevented.

What is claimed is:

1. A digital color encoder for executing a series of digital signal processings including a matrix operational calculation, a frequency band width limitation, a right angle two-phase balancing modulation, and a processing corresponding to an addition of a color burst signal and a synchronization signal, all respectively performed for original color signals obtained from digital video signals corresponding to three original colors of light, and thereby generating a digital composite color video signal sampled with a first sampling frequency, and further generating an analog composite color video signal to be inputted into a television image receiving set by converting the digital composite color video signal by use of a D/A converter, said digital color encoder comprising:

a sampling frequency converter for converting the digital composite color signal sampled with the first sampling frequency to a signal having a second sampling frequency higher than the first sampling frequency; and a filter having a passband around the higher second sampling frequency for receiving an output of the sampling frequency converter, wherein frequencies around the higher second sampling frequency output by the filter are thereafter input into the D/A converter, wherein the conversion and filtering of the digital composite color video signal prior to the D/A conversion suppresses aperture distortion by the D/A conversion.

2. The digital color encoder as defined in claim 1, wherein said sampling frequency converter includes a high-order digital filter for performing interpolative processing based on a value of the digital composite color video signal and wherein a sampling frequency of the digital composite color video signal is converted from the first sampling frequency to the second sampling frequency higher than the first sampling frequency by use of said high-order digital filter.

3. The digital color encoder as defined in claim 2, wherein the high-order digital filter comprises third-order digital filter.

4. The digital color encoder as defined in claim 2, wherein said sampling frequency converter comprises:
  a signal level detector for detecting whether the value of the digital composite color video signal after performing the interpolative processing by use of said high-order digital filter is out of a predetermined range; and
  a signal level protector for correcting the value of the digital composite color video signal so as to put it within the predetermined range when said signal level detector detects that the value of the digital composite color video signal after performing the interpolative processing by use of said high-order digital filter is out of said predetermined range.

5. The digital color encoder as defined in claim 4, wherein said signal level protector corrects the value of the digital composite color video signal to another value at the sampling point immediately before that of a signal level presently being detected when said signal level detector detects that the value of the digital composite color video signal after performing the interpolative processing by use of said high-order digital filter is out of the predetermined range.

6. The digital color encoder as defined in claim 4, wherein said signal level protector corrects the value of the digital composite color video signal to a maximum value, when said signal level detector detects that the value of the digital composite color video signal after performing the interpolative processing by use of said high-order digital filter is out of the predetermined range.

7. The digital color encoder as defined in claim 4, wherein said signal level protector corrects the value of the digital composite color video signal to a minimum value, when said signal level detector detects that the value of the digital composite color video signal after performing the interpolative processing by use of said high-order digital filter is out of the predetermined range.

8. The digital color encoder as defined in claim 1, wherein said sampling frequency converter adds, in a flyback line erasing period, a new sampling point having a value equal to that of the immediately-prior sampling point between the respective sampling points of the digital composite color video signal having the first sampling frequency, and thereby converts the sampling frequency of the digital composite color video signal from the first sampling frequency to the second sampling frequency.

9. The digital color encoder as defined in claim 1, wherein said sampling frequency converter is provided immediately before said D/A converter.

10. A method of processing using a digital color encoder comprising steps of:
  generating a digital composite color video signal sampled with a first sampling frequency;
  converting the digital composite color video signal sampled with the first sampling frequency to a composite color video signal having a second sampling frequency higher than the first sampling frequency;
  filtering the converted signal using a filter having a passband around the higher second sampling frequency, wherein frequencies around the higher second sampling frequency are output;
  generating an analog composite color video signal from the digital composite color video signal having the second sampling frequency output by said filtering step,
  wherein the conversion of the digital composite color video signal to the second sampling frequency prior and filtering to the D/A conversion suppresses aperture distortion by the D/A conversion.

11. The method of processing as defined in claim 10, wherein said step of converting is performed prior to said step of generating the analog composite color video signal.

12. The method of processing as defined in claim 10, wherein said method further comprises steps of:
  using a high-order digital filter for performing interpolative processing based on a value of the digital composite color video signal; and
  converting the digital composite color video signal sampled with the first sampling frequency to the composite color video signal sampled with the second sampling frequency higher than the first sampling frequency by use of the high-order digital filter.

13. The method of processing as defined in claim 12, further comprising steps of:
  detecting whether a value of the digital composite color video signal after performing the interpolative processing by use of the digital filter is out of a predetermined range; and
  correcting the value of the digital composite color video signal so as to put it within the predetermined range, when it is detected that the value of the digital composite color video signal after performing the interpolative processing by use of the digital filter is out of the predetermined range.

14. The method of processing as defined in claim 13, further comprising a step of:
  correcting the value of the digital composite color video signal to another value at the sampling point immediately before that of a present detection of the signal level, when it is detected that the value of the digital composite color video signal after performing the interpolative processing by use of the digital filter is out of the predetermined range.

15. The method of processing as defined in claim 13, further comprising a step of:
  correcting the value of the digital composite color video signal to a maximum value, when it is detected that the value of the digital composite color video signal after performing the interpolative processing by use of the digital filter is out of the predetermined range.

16. The method of processing as defined in claim 13, further comprising a step of:
  correcting the value of the digital composite color video signal to a minimum value, when it is detected that the value of the digital composite color video signal after performing the interpolative processing by use of the digital filter is out of the predetermined range.

17. The method of processing as defined in claim 10, further comprising a step of:

adding in a flyback line erasing period, a new sampling point of a value equal to that of the immediately-prior sampling point between the respective sampling points of the digital composite color video signal having the first sampling frequency, to convert the sampling frequency of the digital composite color video signal from the first sampling frequency to the second sampling frequency.

* * * * *